Patented Oct. 30, 1951

2,573,481

UNITED STATES PATENT OFFICE 2,573,481

CONVERSION OF HYDROCARBONS IN THE PRESENCE OF CRACKING CATALYST CONTAINING BARIUM PEROXIDE

Leonard Eugene Olson, Chicago, Ill., assignor to Sinclair Refining Company, New York, N. Y., a corporation of Maine No Drawing. Application June 26, 1947, Serial No. 757,310

3 Claims. (Cl. 196—52)

My invention relates to improvements in the catalytic conversion of hydrocarbons such as petroleum and other mineral oil stocks to produce gasoline of high anti-knock value, and more particularly to the carrying out of such conversions with a new and improved cracking catalyst comprising barium peroxide which liberates oxygen to act as a homogeneous catalyst.

An important feature of my process comprises an improved catalyst including a silica-alumina or silica-zirconia type material cracking catalysts in which barium peroxide or oxide is incorporated. At cracking temperatures it is believed that the barium peroxide acts as a promoter in conjunction with catalysts of the type referred to and liberates oxygen which acts as a homogeneous catalyst or which activates the other catalytic materials with which the barium peroxide is mixed. The oxygen may act directly as a catalyst in cracking hydrocarbon oils or indirectly to promote the optimum activity of the silica or alumina type catalysts.

The features of my invention may be illustrated in connection with a specific example in which barium peroxide is mixed with a catalytic material comprising a silica-alumina composition of the type now employed in catalytic cracking operations. The mixture includes approximately 10% by weight of barium peroxide and is processed by conventionally known procedure to form the catalytic mixture into porous granular particles, pellets or extruded shapes, or into a fluid type catalyst form. In any case the catalyst as prepared for use advantageously has a very extensive active surface so that the majority of the barium oxide content will be available.

This catalyst, having approximately the composition referred to above is used in the cracking of a gas oil, for example, at a temperature of from 915° to 1015° F., in a reaction zone. The catalyst if in finely divided form may be used as a fluid type catalyst, or if in pellet, extruded or coarse granular form it may be used as a moving bed in a vertical type reactor or as a static bed.

In the reactor the barium peroxide tends to keep the catalyst mass in active state and liberates oxygen which not only effects its activation, but acts as a homogeneous catalyst in the breaking of hydrocarbon molecules. The cracking operation is advantageously carried out at relatively low pressure of from slightly more than atmospheric to approximately 100 lbs. per sq. inch, about 15 lbs. per sq. inch being suitable, so as to facilitate the liberation of the oxygen from the barium peroxide. The oil stock to be cracked is heated in a conventional type still, passed into the reaction chamber, and the resulting cracked product sent to a conventional recovery system including a fractionating tower, condenser and product receivers.

An important feature of my process relates to the regeneration or revivification of the catalyst since the barium peroxide is reduced to barium oxide in the cracking operation. The catalyst, if not used in a fixed bed or beds, is therefore withdrawn from the reaction chamber and regenerated by hydrogenation at temperatures of about 1100° F. by passing the catalyst in intimate contact with hydrogen or hydrogen containing gas so as to hydrogenate the tarry materials which are deposited on the catalyst in the reaction chamber, these materials being made fluid by the hydrogenation and removed in the hydrogenation step. After hydrogenating the catalyst, it is advantageously passed into a chamber at a somewhat lower temperature and contacted with air or oxygen, free of other materials, which would react with barium oxide or peroxide. Oxygen converts the barium oxide to barium peroxide. The conversion of the BaO is advantageously effected by cooling the catalyst in and with a stream of air or oxygen containing gas. In any case, the contact with air or oxygen should be well below 1400° F. and advantageously at temperatures in the range of from 500° to 700° F. At temperatures below 1400° F. barium oxide takes up oxygen to form barium peroxide ($BaO_2$). The catalyst is now ready for reuse in the process.

In the manufacture of composition catalysts in which barium peroxide is employed as an ingredient of the mixture, the $BaO_2$ or $BaO$ may be used in a percentage range of from 5% to 25% by weight. With the relatively inexpensive silica-alumina type catalysts, relatively low percentages are advantageously employed. However, in the regeneration of such catalysts, the operation is preferably conducted to remove adsorbed tarry or coke forming constituents without burning the catalyst as in conventional regeneration procedures, to avoid converting the BaO to unreactive compounds. In some cases the adsorbed materials of the spent catalyst may be removed by means of solvents. The solvent treatment, for example with benzene or naphtha, and hydrogenation, may be combined as a series of steps in any order. The barium peroxide may be combined with any of the metal oxide, clay, silica, alumina, zirconia or similar types of cracking catalysts.

Reference in the appended claims to a cracking catalyst of the silica type will be understood to mean any of the conventional silica-alumina, silica-zirconia and silica-alumina-zirconia cracking catalyst.

In making the improved catalysts of the present invention, either barium oxide, peroxide or a mixture of barium oxide and barium peroxide may be used in making up the catalyst, since the barium oxide content of the catalyst may be readily converted to the peroxide by contacting the catalyst with oxygen at the temperatures referred to above.

I claim:

1. The improvement in the cracking of higher boiling hydrocarbon oils for the production of gasoline therefrom, which comprises subjecting the oil to a cracking temperature in the presence of a cracking catalyst having intimately admixed therewith a substantial proportion of barium peroxide, recovering the converted products from the cracking operation, regenerating the used catalyst under conditions adapted to preserve the barium oxide in the spent catalyst, the regenerating operation including the steps of removing any carbon and tarry constituent from the catalyst by hydrogenation and thereafter cooling the catalyst in a stream of gas comprising oxygen to convert the barium oxide of the catalyst to barium peroxide, and reusing the regenerated catalyst in the cracking operation.

2. The improvement in the cracking of higher boiling hydrocarbon oils for the production of gasoline therefrom, which comprises subjecting the oil to a cracking temperature in the presence of a cracking catalyst having intimately admixed therewith a substantial proportion of barium peroxide, recovering the converted products from the cracking operation, regenerating the used catalyst to preserve the barium oxide in the spent catalyst, and reusing the regenerated catalyst in the cracking operation, the regenerating operation comprising the step of first removing the carbonaceous material deposited on the catalyst during the cracking operation and then a subsequent step of converting the barium oxide to barium peroxide.

3. The improvement in the cracking of higher boiling hydrocarbon oils for the production of gasoline therefrom, which comprises subjecting the oil to a cracking temperature in the presence of a cracking catalyst having intimately admixed therewith a substantial proportion of barium peroxide, recovering the converted products from the cracking operation, regenerating the used catalyst to preserve the barium oxide in the spent catalyst, and reusing the regenerated catalyst in the cracking operation, the regenerating operation comprising the step of first removing the carbonaceous material deposited on the catalyst during the cracking operation and then a subsequent step of converting the barium oxide to barium peroxide by reacting the barium oxide with oxygen at temperatures in the range of 500° to 700° F.

LEONARD EUGENE OLSON.

REFERENCES CITED

The following references are of record in the file of this patent:

UNITED STATES PATENTS

| Number | Name | Date |
| --- | --- | --- |
| 1,733,656 | Egloff et al. | Oct. 29, 1929 |
| 2,245,735 | Subkow | June 17, 1941 |
| 2,317,494 | Thomas | Apr. 27, 1943 |
| 2,388,008 | Pier | Oct. 30, 1945 |
| 2,419,342 | Edson et al. | Apr. 22, 1947 |